Nov. 30, 1965  S. P. WILLITS ETAL  3,220,569
CONVEYING APPARATUS
Filed Nov. 27, 1963  4 Sheets-Sheet 1
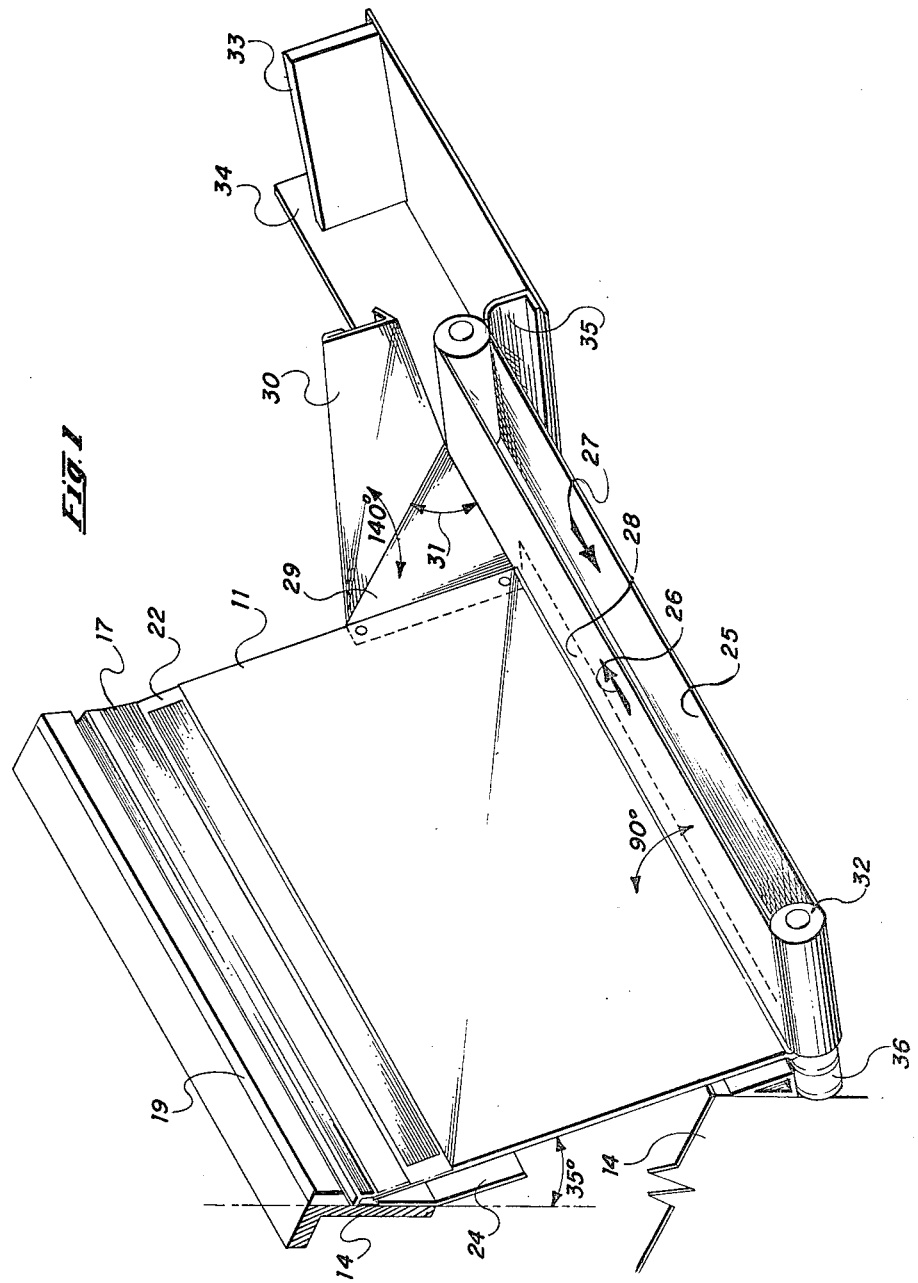
SAMUEL P. WILLITS
WILLIAM L. MOHAN, JR.
INVENTORS
BY *Jacques L. Meister*
AGENT.

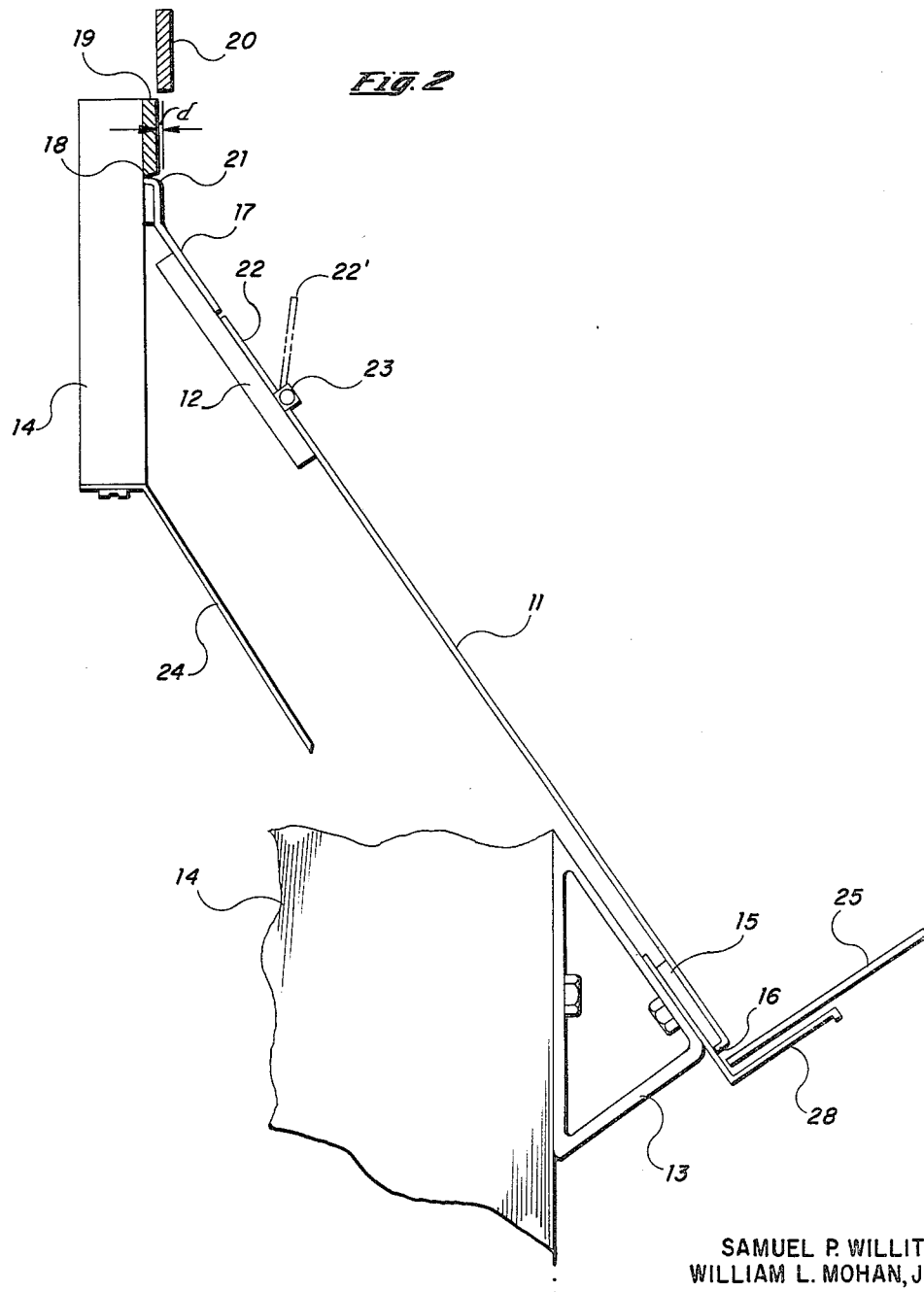

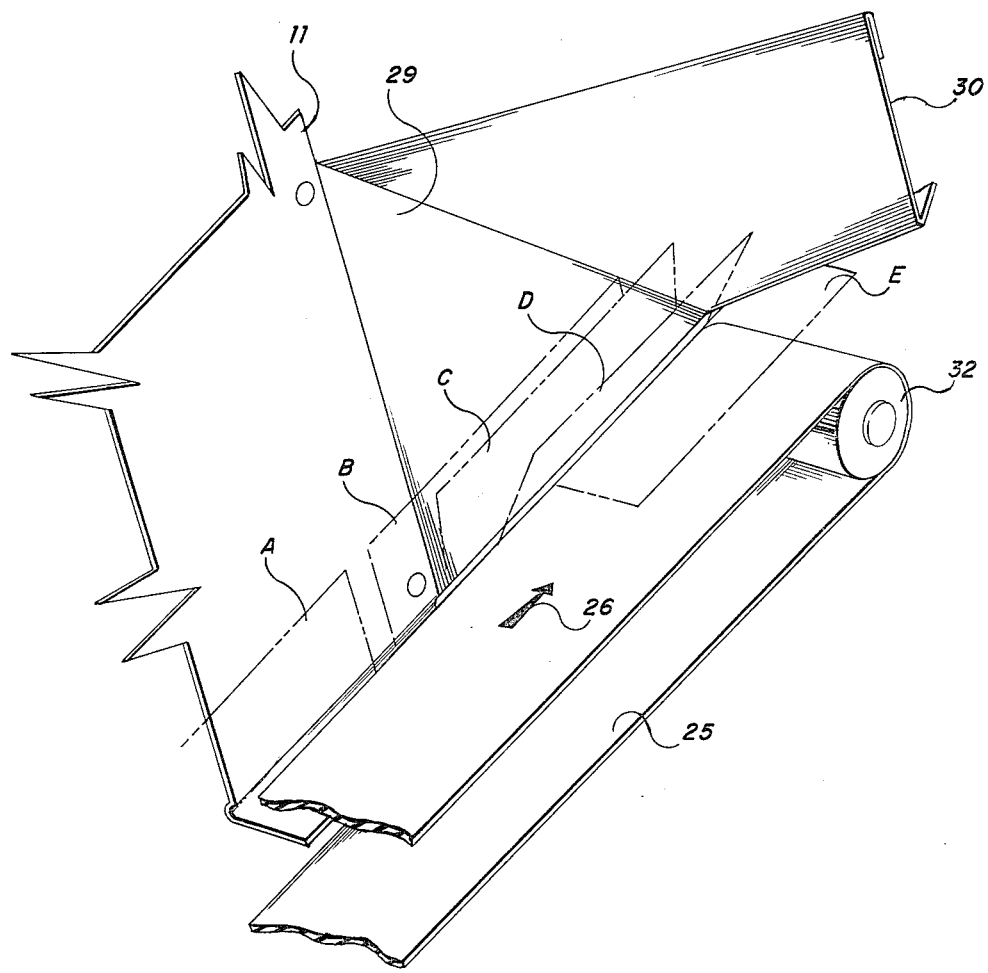

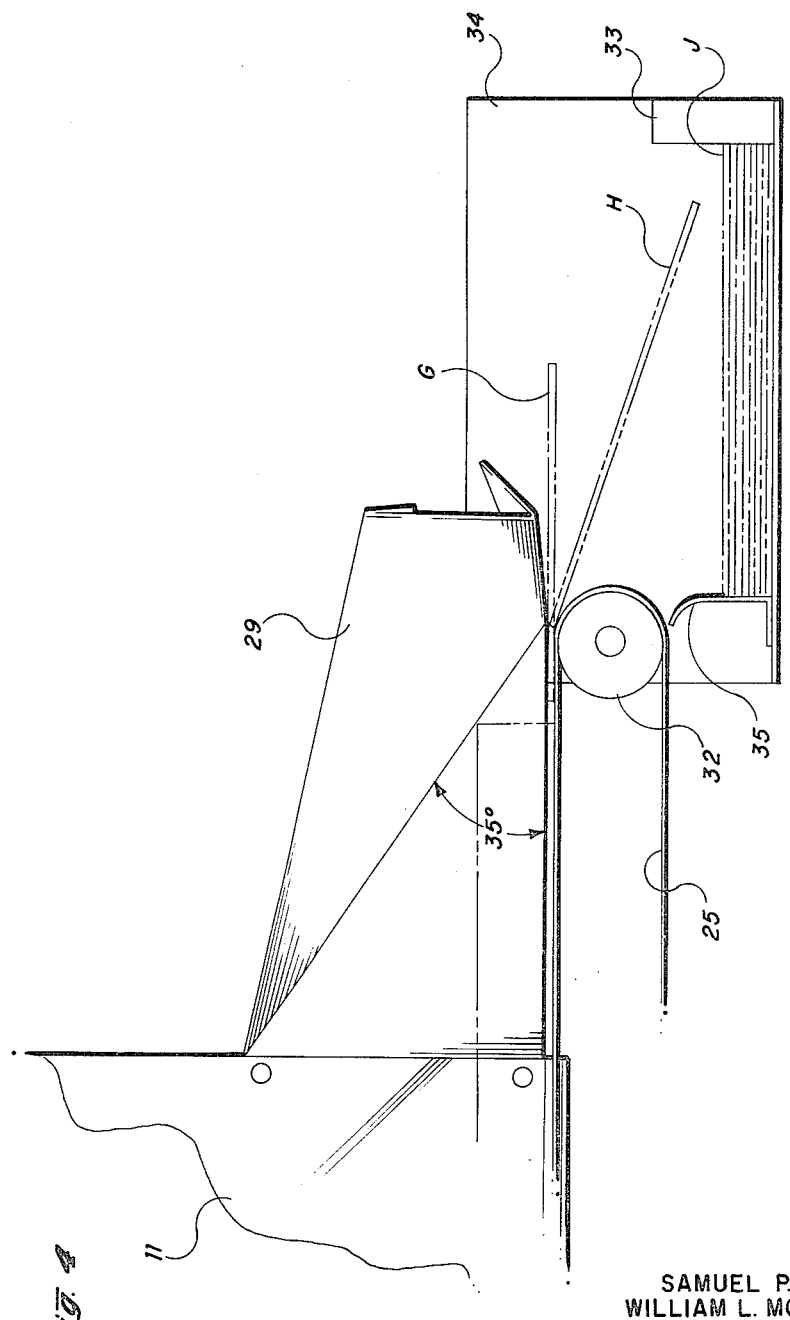

United States Patent Office 3,220,569
Patented Nov. 30, 1965

3,220,569
CONVEYING APPARATUS
Samuel P. Willits, Barrington, and William L. Mohan, Jr., Prospect Heights, Ill., assignors to Spartanics, Ltd., Barrington, Ill., a corporation of Wisconsin
Filed Nov. 27, 1963, Ser. No. 326,473
4 Claims. (Cl. 214—6)

This invention relates generally to conveying apparatus and more particularly to conveying apparatus which turns conveyed strips over and stacks them one upon the other.

Many types of conveying apparatus have been employed in conjunction with machine tools to transfer parts and material both to and from work stations. Frequently the prior art conveying apparatus has incorporated therein or as adjuncts thereto, features or devices for repositioning the conveyed parts. However, in most instances the prior art devices were relatively expensive and, when it was desired to use them with relatively inexpensive machine tools, cost was a prohibiting factor. One industry faced with such a dilemma has been the manufacturers of nameplates and dials.

In the nameplate and dial industry, it is customary to preprint or otherwise mark large sheets with many of the dial patterns arranged in a row and with several rows to a sheet. Then, as a process step, the sheets are sheared into strips comprising each of the rows on the sheet. By this stage in their processing both the sheets and the strips sheared therefrom have attained a considerable value. Because of the high value of the strips and because the sheared strips can easily damage each other if haphazardly dropped, it is customary in the industry to station a laborer behind the shear to catch and stack the strips as they are sheared from the sheet.

While the catching and stacking of the sheared strips overcome the problem of damaging the strips, it is a relatively expensive solution to the problem. The expense includes not only that incurred by the addition of direct labor to the process but, also embraces hidden costs. Among these hidden costs is the increase in employer liability for personal injury occasioned because the laborer is stationed in a dangerous area and, because the sheared strips handled by the laborer usually have very sharp edges. Costs are also frequently increased because of inability of the laborer to catch and stack as rapidly as strips could otherwise be sheared.

Accordingly, it is a general object of this invention to obviate the damage-cost problems encountered in the hand catching and stacking of sheared strips.

Another general object of this invention is to provide an improved combination strip conveying and stacking apparatus that may be readily adapted to shears.

Still another object of the invention is to provide improved strip conveying and stacking apparatus that is inherently free from the possibility of damaging the strips handled thereby.

Yet another object of the invention is to provide improved strip conveying and stacking apparatus having switch means integral therewith whereby selected ones of said strips can be diverted from the stacker.

A special object of the invention was achievement of the foregoing objects with apparatus that was both inexpensive and durable.

These and other objects of the invention are realized in accordance with a specific illustrative embodiment of the invention wherein an energy absorbing drop guide diverts the sheared strips so they fall print side up upon an inclined guide plate. Forming a part of the inclined guide plate is a movable switch like door which is actuatable to either divert the sheared strips down a chute or to allow them to continue their fall down the inclined guide plate where they impact edgewise on a soft resilient belt moving transverse to the direction of fall down the inclined guide plate. The moving belt carries the strips, still on edge, until their leading edge contacts a unique tipper guide. The tipper guide guides the strips moving across its face so that they are turned printed side down upon the moving belt. As the strips are tipped to their printed side down position upon the conveyor belt, they are also positioned for edge guidance between the bottom edge of the inclined guide plate and the moving belt. Thus edge guided and propelled by the belt the strips are trajected outward toward a resting place in a stacker basket. By adjustment of bottom and end guides in the stacker basket and because of the edge guiding and an air cushion effect beneath the trajected strips, they settle gently one upon the other in the stacker basket without injury to their printed faces.

The invention, both as to its structure and mode of operation, will be better understood by reference to the following disclosure and drawings forming a part thereof, wherein:

FIGURE 1 is a perspective view of the inventive stacking and conveying apparatus shown affixed to a shear;

FIGURE 2 is a cross section through the conveying and stacking apparatus shown in FIGURE 1;

FIGURE 3 is a perspective view illustrating the operation of the tipper-guide empolyed in the invention; and FIGURE 4 illustrates the relationship of the stacker basket to the conveyors of the invention.

Referring now to the drawings, the general arrangement of conveying and stacking apparatus embodying the invention is shown in FIGURES 1 and 2. As there illustrated, the invention comprises an inclined guide plate 11, suitably affixed by means of brackets 12 and 13 and miscellaneous fasteners to the frame 14 of a shear. Advantageously, a spacer block 15 may be interposed between bracket 13 and guide plate 11. Insertion of block 15 permits the forming of a bottom edge guide flange 16 on guide plate 11 for purposes described later.

A feature of the invention is realized by the form and positioning of drop guide 17. As can best be seen in FIGURE 2, the top edge 18 of drop guide 17 extends beneath the lower surface of stationary shear blade 19 to prevent strips sheared by the action of moving shear blade 20 from lodging behind the guide. While this construction and positioning is desirable, a still more desirable feature is achieved by a construction which reduces or prevents bounce of the sheared strips when they impact upon the inclined guide plate 11. Bouncing is objectionable at this or any point in the handling of the sheared strips because it both tends to damage the strips directly and also increases the likelihood that they be conveyed upon their printed face which further damages them.

Bounce prevention or reduction by drop guide 17 is achieved by a combination of two actions. The first of these actions is energy absorption. As each of the strips is sheared it falls with its printed side up or away from the drop guide. Its bottom or unprinted side impacts upon a surface 21 of the guide 17 projecting rearwardly of fixed shear blade 19. This results in energy being transferred from the strip and also implements the second action, namely, a partial turning of the strip so that it tends to fall with its flat surface parallel to guide plate 11 or nearly so. This last action is particularly important when the sheared strips are narrow since narrow strips appear to have a natural tendency to drop without turning, whereas wider strips are partially turned by the shearing alone.

Both of the actions which reduce bounce are achieved by properly proportioning and positioning the guide 17. The positioning is solely related to the distance $d$ that projecting surface 21 extends beyond the rear surface of the stationary shear blade 19. More projection of surface 21 results in more energy absorption and less turning of the sheared strip. Proper proportioning of the guide 17 involves principally the height of the vertical surface above the transitional curve to the plane of guide plate 11. The greater the height, the more the sheared strip turns before impacting on guide plate 11. Since positioning of surface 21 and height of guide 17 are interrelated and are further related to the angular orientation of guide plate 11, it is not possible to exactly define the preferred proportions for all possible embodiments. In general, the distance of uncontrolled fall should be kept as small as possible. For embodiments where sheared strips vary between ½ inch and 6 inches wide and where the angle of guide plate 11 with respect to vertical is 30 to 40 degrees, it has been found that the distance $d$ that surface 21 extends beyond the shear blade should be a minimum of about 1/32 of an inch and the vertical height of the guide must be on the order of 2 to 4 inches.

Located part way down the length of inclined guide plate 11 is a switch like door 22 pivotable upward about hinges 23. As can be appreciated, opening door 22 to the position indicated in phantom outline at 22′ will result in diverting sheared strips downward where they may be conducted as desired by guide 24. Since the preprinted sheets often have an unprinted scrap portion at their edge which must be trimmed off before the dial imprinted strips are sheared, by positioning the door in diverting position 22′ when scrap is being trimmed, segregation of the scrap is effected. Any conventional means such as a solenoid or similar apparatus, under operator or automatic control, can be used to selectively actuate the door. Since the door actuating means forms no part of this invention, it is not further described herein.

After being sheared, the dial imprinted strips are guided in their fall by inclined guide plate 11 until they impact edgewise on a conveyor belt 25 whose upper and lower reaches move about pulleys 32 in the direction indicated by arrows 26 and 27, respectively, under the impetus of a motor 36. To prevent damage to the sheared strip when it impacts upon belt 25, the belt is made from a soft resilient elastomer, such as rubber. Making the belt of rubber or other suitable elastomer also provides the relatively high coefficient of friction required between the belt and the sheared strip for good conveying action. While making the belt resilient does provide a cushioning effect, it makes necessary a shelf-like guide 28 shown positioned beneath the top surface of the belt. Guide 28 prevents excessive belt deformation at the time of impact of the strips.

The moving belt 25 carries the sheared strips, still on edge and guided by the inclined plane surface of guide plate 11, until their leading edge contacts a tipper guide 29 extending out over belt 25. The action of the tipper guide 29 in turning the strips so that they rest printed side down on belt 25 is best seen by referring to FIGURE 3. The position of a sheared strip just before its leading edge contacts the tipper guide is shown at A. As the belt 25 moves the strips toward the guide, it successively turns them through the positions indicated at B, C and D until they finally come to rest, printed side down, on the belt as shown at E. Note that in position E, the edge of the sheared strip is beneath guide flange 16.

The angular relationship of tipper guide 29 to belt 25 and guide plate 11 and the relationship of each of these to the vertical is important to the successful operation of the inventive apparatus. The angle between inclined guide plate 11 and the vertical is a compromise based on desired conveying rate and the degree of guidance desired. As the angle between guide plate 11 and the vertical is decreased, conveying rate and hence capacity is increased but, guidance properties are reduced. Applicants have found that the angle selected based on this compromise always appear to lie between 15 and 60 degrees. In one illustrative embodiment employing conveying rates of two pieces per second, 35 degrees has proven satisfactory.

To prevent strips from turning over or laying flat after they impact upon conveyor belt 25, it has been found that the angle between the belt surface and the inclined guide plate 11 should be maintained between 75 and 90 degrees. Further, it has been found that the belt surface should be inclined a minimum of 20 degrees with respect to the horizontal in the manner shown.

To insure reliable tipping action by the tipper guide, its relationship to vertical and to belt 25 and guide plate 11 is quite critical. In the illustrated embodiment having its inclined guide plate orientated at an angle of 35 degrees from the vertical, maintaining an angle of 140 degrees between the tipper guide surface 30 of tipper guide 29 and the plane of the guide plate 11 has proven advantageous. The 140 degree angle results in strips being tipped from their 35 degree orientation imposed by guide plate 11, through vertical, and thence up to 15 degrees beyond the vertical as their leading edge contacts and glides across surface 30. It has been found that the guide surface 30 should be angled to nominally tip the strip at least 5 degrees beyond vertical to insure reliability in the tipping action. This is necessary since there appears to be about a 5 degree uncertainty in the inclination of the strips relative to guide plate 11 as they are carried by belt 25. It has been further discovered that angling guide surface 30 to tip strips more than about 15 degrees beyond vertical is not only unnecessary but that guides so inclined usually interfere with the tipping action. The angle designated 31 is not critical but must be small enough to provide a component forcing the strip down toward the belt to give good driving friction during the tipping action. In practice, 30–45 degrees have proven to be convenient and useful angles.

Action of the inventive apparatus in propelling and trajecting the sheared strips into their stacked position is best seen with the reference to FIGURES 2 and 4. After being tipped, printed side down on belt 25, one edge of the sheared strips is positoned for partial guidance in the groove formed by guide flange 16, belt 25 and the shelf-guide 28. This partial guidance of the sheared strips is highly advantageous since it permits belt 25 to propel the strips in a generally horizontal position G for a considerable portion of their length as they project beyond belt drive roller 32 and over the stacker backet 34. Guiding the strips for as long as possible as they are trajected into the stacker basket is desirable since it improves the accuracy with which the stacked strips are alined. As the strips leave the confine of the guide groove, their leading edges tilt downwardly and they are trajected toward their stacked position at an angle similar to that illustrated for the strip H.

After the strips leave belt 25 their leading edge contacts both the top one of the strips J previously stacked and end stop 33. End stop 33 is adjustabe laterally and is positioned along the length of basket 34 depending on the length of the sheared strips. Stop 33 may be secured to the bottom or back walls of basket 34 in its adjusted position in any convenient manner; magnetic coupling being one method that has proven especially advantageous. After contacting stop 33, because of an air cushion effect beneath it, the trailing edge of the strips settle gently down upon strip J. Enhancing the air cushion effect is the function of fixed guide 35.

While the invention as to its features and details of construction has been described in specific terms referring to the illustrative embodiment shown, the inventors have no desire to be limited thereby. Rather, they intend to cover their invention broadly within the spirit and scope of the following claims.

We claim:
1. In strip conveying apparatus of the type useful with shears having fixed and movable blades, the combination comprising
- a drop guide positioned partially beneath and extending beyond the cutting plane of said fixed blade into the path of falling sheared strips, said drop guide thereby being adapted to absorb energy from and partially turn sheared strips impacting thereon,
- an inclined guide plate secured to and beneath said drop guide to guide sheared strips in their fall,
- a resilient belt conveyor moving transverse the plane of said inclined guide plate for receiving and moving said sheared strips on edge and guided by said inclined guide plate,
- a tipper guide interposed in the path of said moving strips for tipping said strips from their inclination parallel to the plane of said inclined guide plate through and beyond vertical to cause said strips to fall flat on said moving belt conveyor,
- means for edge guiding strips laying flat on said belt conveyor, and
- a stacker basket for receiving strips discharged from said moving belt.

2. In strip conveying appartus of the type useful with shears having fixed and movable blades for shearing from sheets strips which fall face up, the combination comprising
- drop guide means positioned beneath and partially extending beyond the cutting plane of said fixed blade into the path of falling sheared strips whereby said strips are slowed in their fall and partially turned by their impact on said drop guide,
- an inclined guide plate secured to and beneath said drop guide to guide sheared strips in their fall, said inclined guide plate having a switch-like door therein selectively positionable between positions flush with said inclined guide plate or upstanding therefrom to route said sheared strips upon or beneath said inclined guide plate,
- a belt conveyor positioned partially beneath the lower edge of said inclined guide plate, said belt conveyor being adapted to receive said sheared strips and convey them on edge and guided by said inclined guide plate in a direction transverse to their last preceding direction of fall, said belt conveyor being inclined at least 20 degrees from the horizontal and inclined between 75 and 90 degrees with respect to the plane of said inclined guide plate,
- a tipper guide interposed in the path of said moving strips for tipping said strips from their inclination parallel to the plane of said inclined guide plate through and beyond vertical to cause said strips to fall flat on said belt conveyor, and
- a stacker basket for receiving strips discharged from said moving belt, said stacker basket having bottom and back walls and a fixed guide and an adjustable end stop whereby sheared strips are stacked face down one upon the other.

3. Strip conveying appartus in accord with claim 2 wherein said inclined guide plate is inclined between 30 and 40 degrees from the vertical.

4. Strip conveying apparatus in accord with claim 3 wherein said tipper guide is constructed to cause said strips to be tipped between 5 and 15 degrees beyond vertical.

References Cited by the Examiner

UNITED STATES PATENTS

| | | | |
|---|---|---|---|
| 2,358,413 | 9/1944 | Monaco | 214—7 |
| 2,792,218 | 5/1957 | Van Marle | 214—11 X |
| 2,905,295 | 9/1959 | Anderson | 198—33.3 X |
| 3,052,467 | 9/1962 | Fertig | 271—71 |
| 3,062,391 | 12/1962 | Francois | 214—11 |

GERALD M. FORLENZA, *Primary Examiner.*

MORRIS TEMIN, *Examiner.*